(12) United States Patent
Tondu

(10) Patent No.: US 12,059,869 B2
(45) Date of Patent: Aug. 13, 2024

(54) LAMINATED GLAZING WITH IMPROVED RESISTANCE TO RELATIVELY DISCRETE IMPACT TYPES

(71) Applicant: SAINT-GOBAIN GLASS FRANCE, Courbevoie (FR)

(72) Inventor: Thomas Tondu, Saint-Martin d'Abbat (FR)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 265 days.

(21) Appl. No.: 17/778,279

(22) PCT Filed: Nov. 18, 2020

(86) PCT No.: PCT/FR2020/052122
§ 371 (c)(1),
(2) Date: May 19, 2022

(87) PCT Pub. No.: WO2021/099740
PCT Pub. Date: May 27, 2021

(65) Prior Publication Data
US 2022/0388280 A1    Dec. 8, 2022

(30) Foreign Application Priority Data

Nov. 20, 2019  (FR) ...................................... 1912943

(51) Int. Cl.
*B32B 17/10* (2006.01)
*B32B 7/022* (2019.01)
(Continued)

(52) U.S. Cl.
CPC ........ *B32B 17/10027* (2013.01); *B32B 7/022* (2019.01); *B32B 7/023* (2019.01);
(Continued)

(58) Field of Classification Search
None
See application file for complete search history.

(56) References Cited

U.S. PATENT DOCUMENTS 4,081,581 A    3/1978  Littell
5,908,675 A    6/1999  Marquardt et al.

FOREIGN PATENT DOCUMENTS

EP    0 459 704 A1    12/1991
GB    2260512 A  *  4/1993  ....... B32B 17/10045

OTHER PUBLICATIONS

International Search Report as issued in International Patent Application No. PCT/FR2020/052122, dated Feb. 11, 2021.

* cited by examiner

*Primary Examiner* — Ramsey Zacharia
(74) *Attorney, Agent, or Firm* — Pillsbury Winthrop Shaw Pittman LLP

(57) ABSTRACT

A laminated glazing includes a structural transparent substrate bonded to a glass sheet of 0.5 to 4 mm, intended to constitute an outer surface of the laminated glazing, by an adhesive interlayer of 4 to 10 mm, which successively includes 0.25 to 2.5 mm of a flexible first polymer material having a relaxation modulus at most equal to 2 GPa for relaxation times at least equal to 10 min, at temperatures at least equal to −40° C., in contact with the glass sheet, then a stiff second polymer material having a relaxation modulus at least equal to 4 GPa, for time constants at most equal to 0.1 millisecond and temperatures at most equal to 40° C.

16 Claims, 2 Drawing Sheets

(51) Int. Cl.
*B32B 7/023* (2019.01)
*B32B 7/05* (2019.01)
*B32B 7/12* (2006.01)

(52) U.S. Cl.
CPC ............... *B32B 7/05* (2019.01); *B32B 7/12* (2013.01); *B32B 17/10091* (2013.01); *B32B 17/10119* (2013.01); *B32B 17/10137* (2013.01); *B32B 2250/03* (2013.01); *B32B 2250/40* (2013.01); *B32B 2270/00* (2013.01); *B32B 2307/412* (2013.01); *B32B 2367/00* (2013.01); *B32B 2605/006* (2013.01)

[Fig. 1]
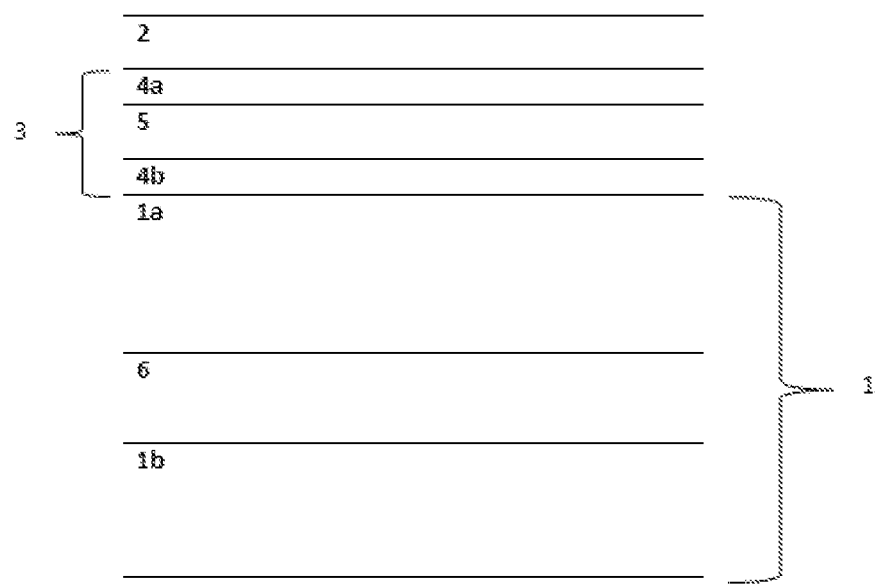
[Fig. 2]
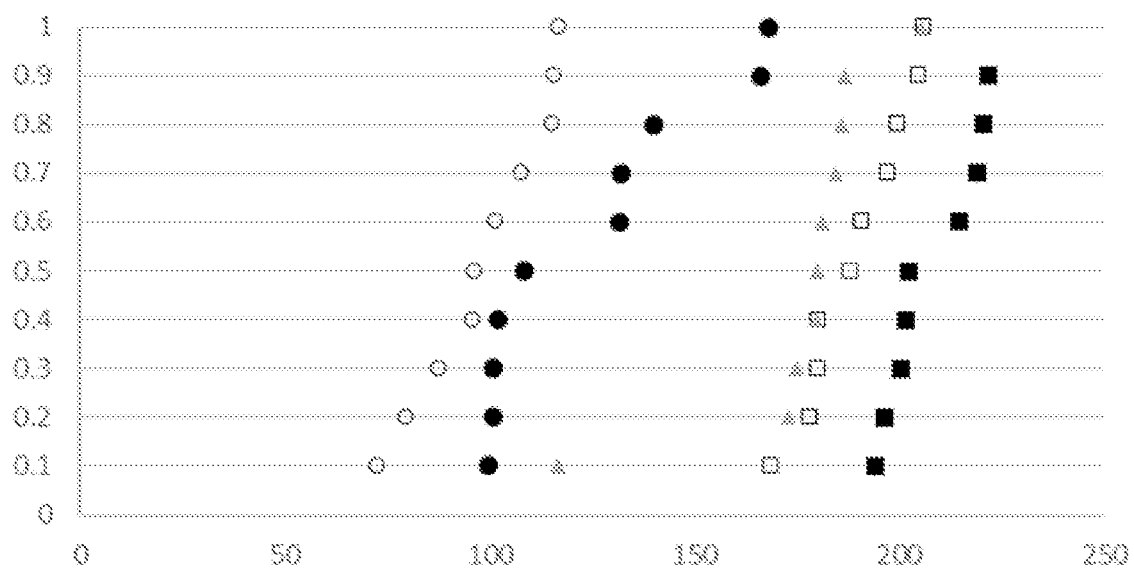

[Fig. 3]
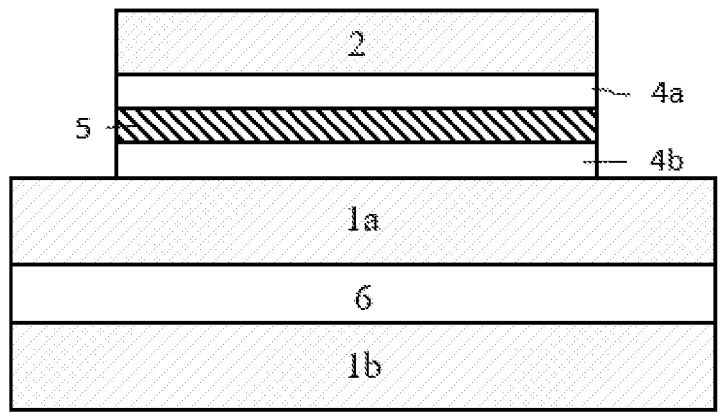
[Fig. 4]
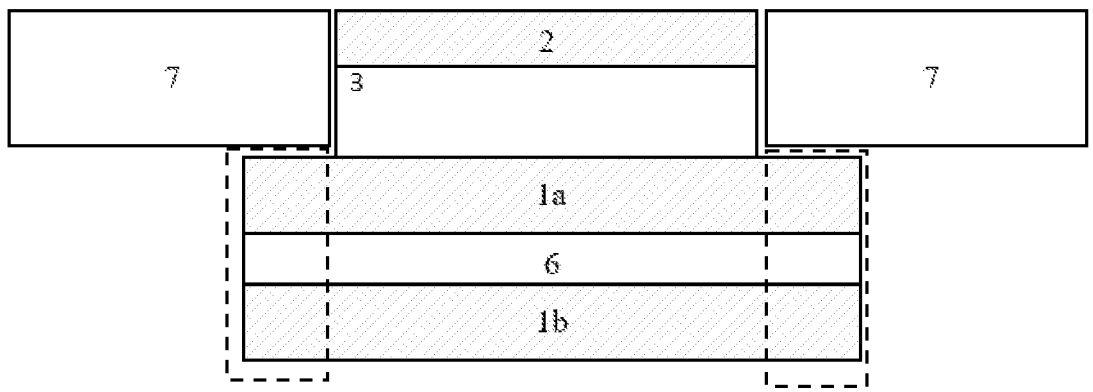
[Fig. 5]
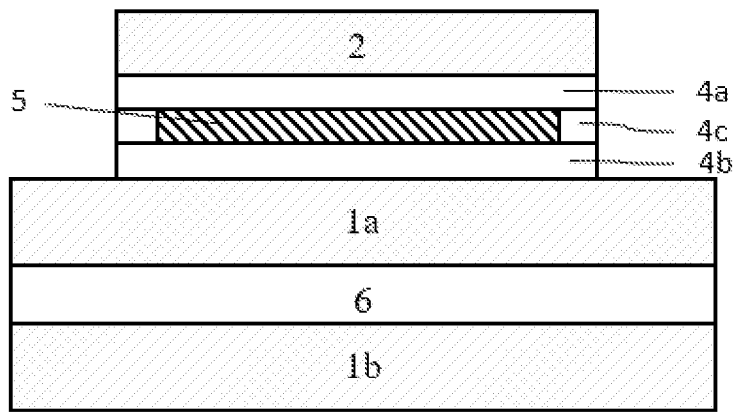

LAMINATED GLAZING WITH IMPROVED RESISTANCE TO RELATIVELY DISCRETE IMPACT TYPES

CROSS-REFERENCE TO RELATED APPLICATIONS

This application is the U.S. National Stage of PCT/FR2020/052122, filed Nov. 18, 2020, which in turn claims priority to French patent application number 1912943 filed Nov. 20, 2019. The content of these applications are incorporated herein by reference in their entireties.

The present invention relates to a glazing for an airborne, terrestrial or water-borne vehicle, or for buildings, preferably an aeronautical glazing, having an increased performance in several types of impacts, including hail and small birds. More particularly concerned are the aircraft with heated glazing such as business jets, regional aircraft of the type sold by the company ATR for example, commercial aircraft, medium-haul aircraft, long-haul aircraft, etc.

Aircraft windshields in particular consist of a so-called structural block having a mainly mechanical function (resistance to pressure stresses and to impact by the largest birds) combined, for instance by lamination, with a sheet (or ply), for instance of glass, providing the interface with the outside of the aircraft. This sheet, owing to a heating function, makes it possible to prevent the appearance of frost in flight; it must also withstand the windshield wipers and sandblasting.

These constraints make glass a material of choice for this outer ply, owing to its good scratch resistance properties, its good thermal properties and the possibility of applying heating conductive layers that deliver high specific powers.

Furthermore, for reasons of aerodynamic continuity, the outer glass is laminated with a relatively thick mat of interlayer adhesive. An interlayer adhesive denotes in this case a polymer material bonding two sheets of mineral and/or organic glass together. Mention is made, as examples of organic glass, of poly(methyl methacrylate) (PMMA), polycarbonate (PC), polyurethane (PU) and, as examples of interlayer adhesive, of polyvinyl butyral (PVB), thermoplastic polyurethane (TPU), ethylene/vinyl acetate copolymer (EVA).

Due to the relatively high thickness of the mat of interlayer adhesive, the outer glass, under the impact of hail (up to 50 mm in diameter) or small birds, is bent possibly until it ruptures. This constraint prevents the thickness of this outer glass, which is typically 3 mm, from being reduced. However, reducing this thickness may make it possible to reduce the mass of the glazings.

If the thickness of the outer glass is reduced, its resistance to hail is intrinsically lower, and the interlayer mat is thickened in order to maintain aerodynamic continuity.

A frequent reason for removal of the glazings remains their rupture under the impact of hail or small birds.

To overcome these drawbacks, one subject of the invention is a laminated glazing comprising a structural transparent substrate bonded to a glass sheet with a thickness of between 0.5 and 4 mm, intended to constitute an outer surface of the laminated glazing, by means of an adhesive interlayer with a thickness of between 4 and 10 mm, characterized in that the adhesive interlayer successively comprises a thickness of between 0.25 and 2.5 mm of a flexible first polymer material having a relaxation modulus at most equal to 2 GPa for relaxation times at least equal to 10 min, at temperatures at least equal to −40° C., in contact with the glass sheet, then a thickness of a stiff second polymer material having a relaxation modulus at least equal to 4 GPa, for time constants at most equal to 0.1 millisecond and temperatures at most equal to 40° C. (conditions representative of a hail-type impact on aircraft).

Due to the mechanical and thermomechanical stresses in the phases of production and use of the glazings, a flexible behavior of the bonding interlayer of the glasses is desirable in order to limit the excessive stresses in the glass that may lead to the breakage thereof, or at the bonded interfaces that may give rise to delamination. For these reasons it is advantageous to combine, between the median (or second starting from the exterior atmosphere) and outer glasses, a "stiff" polymer material that enables good performance with respect to hail and a "flexible" polymer material for limiting the thermomechanical and mechanical stresses in the glazing. The stiffness of the stiff material is evaluated as a function of the typical impact stresses, whilst that of the flexible material is evaluated relative to the thermomechanical and mechanical stresses, in particular associated with aircraft pressurization rates.

The structural transparent substrate consists of a glass sheet or more commonly several laminates, the combined thickness of which is relatively large in order to take on the abovementioned mechanical role. It may be a mineral glass, but also organic glass such as poly(methyl methacrylate) (PMMA), polycarbonate (PC) or polyurethane (PU).

By means of the invention, the increased stiffness of the adhesive interlayer limits the deformations of the glass sheet and therefore repels the impact velocity of hail or small birds causing breakage. It is therefore possible to use a thinner glass sheet that reduces the mass of the laminated glazing.

Preferably, 40% to 90% of the thickness of the adhesive interlayer consist of said stiff second polymer material, and 10% to 60% of this thickness consist of said flexible first polymer material.

Preferably, a thickness of said flexible first polymer material is inserted between and in contact with the thickness of said stiff second polymer material and the structural transparent substrate.

Preferably, the relaxation modulus of said first polymer material is at most equal to 2 GPa, preferably 0.5 GPa for relaxation times at least equal to 10 min, at temperatures at least equal to −40° C.

Preferably, the elastic modulus of said second polymer material is at least equal to 5 GPa, for time constants at most equal to 0.1 millisecond and temperatures at most equal to 40° C.

Preferably, the thickness of the glass sheet is between 1.5 and 3 mm.

Preferably, said glass sheet consists of chemically toughened glass, in particular of soda-lime or aluminosilicate type, or is thermally tempered.

Preferably, the structural transparent substrate comprises at least one glass sheet or several laminates, in particular of aluminosilicate or soda-lime type, at least one of which may be chemically toughened; the term "glass" denotes in this case also a structural transparent organic polymer material such as poly(methyl methacrylate) (PMMA), polycarbonate (PC), polyurethane (PU), polyester such as poly(ethylene terephthalate) (PET) or the like.

Preferably, said first polymer material is chosen from a thermoplastic polyurethane (TPU), polyvinyl butyral (PVB), ethylene-vinyl acetate (EVA) alone or as a mixture or copolymer of several thereof.

Preferably, said second polymer material is chosen from a poly(methyl methacrylate) (PMMA), polycarbonate (PC), polyurethane (PU), polyester such as poly(ethylene terephthalate) (PET) alone or as a mixture or copolymer of several thereof.

Often, said stiff second polymer material extends to the edges of said glass sheet. However, preferably, said stiff second polymer material is set back with respect to the edges of said glass sheet. This arrangement makes the periphery of the glazing (zone most subjected to cold temperatures) more flexible, so as to improve the reliability. Such an encapsulation of the interfaces between stiff and flexible polymer materials limits the risks of delamination. Furthermore, space is thus freed up for routing the connection systems.

Preferably, the glass sheet intended to constitute an exterior surface of the laminated glazing and the stiff polymer material are set back with respect to the structural transparent substrate, so as not to form part of the attachment of the laminated glazing.

Another subject of the invention consists of the application of a laminated glazing as described above as glazing for an airborne, terrestrial or water-borne vehicle, or for buildings, in particular as aircraft glazing.

The appended drawings illustrate the invention:

FIG. 1 schematically represents, in cross section, a laminated glazing in accordance with the invention.

FIG. 2 is a graph representing the results of a second series of hail impact tests.

FIG. 3 is a schematic, cross-sectional representation of a laminated glazing according to the invention, the exterior glass sheet and the stiff polymer material of which are set back with respect to the structural transparent substrate, so as not to form part of the attachment of the laminated glazing.

FIG. 4 schematically represents the attachment of the glazing from FIG. 3 to the cabin of an aircraft.

FIG. 5 schematically represents, in cross section, a laminated glazing according to the invention that differs from that of FIG. 3 only by a stiff polymer material set back with respect to the exterior glass sheet.

This laminated glazing comprises two main glass elements: a structural transparent substrate or block 1 and a glass sheet 2 intended to be in contact with an exterior atmosphere from where a relatively discrete/light impact, such as hail or a small bird, is capable of originating.

The structural transparent block 1 is formed so as to guarantee that the laminated glazing has all the mechanical strength required, with respect to the pressure variations to which an aircraft may be subjected, for example, and the greatest impacts, such as large birds. It is formed of two 8-mm thick sheets of chemically toughened aluminosilicate glass 1a and 1b bonded to one another by a layer 6 of PVB with a thickness of 2.28 mm, it being possible for this thickness to be in general between 1.5 and 3 mm.

The glass sheet 2 is made of chemically toughened soda-lime glass with a thickness between 1.5 and 3 mm. It is bonded to the structural transparent block 1 by a relatively thick adhesive interlayer 3. In the event of a quasi-discrete impact of hail type, the mat that forms this adhesive interlayer 3 deforms under the glass sheet 2, enabling it thus to flex under the effect of the impact.

The adhesive interlayer 3 consists of a layer of polymethyl methacrylate (PMMA) 5 with a thickness of 1 to 9 mm, between two layers of thermoplastic polyurethane (TPU) 4a, respectively 4b with a thickness of 0.25 to 2.5 mm, respectively 0.25 to 5 mm. The relaxation modulus of the PMMA 5 for time constants at most equal to 0.1 millisecond and temperatures at most equal to 40° C. is between 6 and 7 GPa, the relaxation modulus of the TPU for relaxation times at least equal to 10 min, at temperatures at least equal to −40° C., is 1 GPa.

To carry out hail impact tests, use was made of test specimens of 500 mm×500 mm consisting of a monolithic structural ply and a glass exposed to hail, bonded to one another by an interlayer mat (TPU) optionally reinforced by a PMMA. The composition of these laminated glazings is indicated in the following table.

TABLE 1

| Name of the glazing | Structural ply | Glass exposed to hail | Interlayer (mm)/ PMMA (mm)/ Interlayer (mm) | Outer glass + Interlayer + PMMA (mm) |
|---|---|---|---|---|
| Standard | Glass 8 mm | 2.8 mm semi tempered | 7.2/0/0 | 10.0 |
| Lightweight | Glass 8 mm | 1.6 mm CT | 7.2/0/0 | 8.8 |
| Reinforced | Glass 8 mm | 2.8 mm semi tempered | 1.25/4.5/1.25 | 9.8 |
| Lightweight reinforced | Glass 8 mm | 1.6 mm CT | 1.25/6/1.25 | 10.1 |
| Reinforced PMMA | PMMA 18 mm | 1.6 mm CT | 1.25/0/0 | 2.85 |

These five laminated glazings are subjected to firing of 25-mm diameter hailstones at incremental velocities (increment of 5 m/s) until breakage. Ten test specimens are used for each laminated glazing composition. The results are represented in FIG. 2, in which the standard glazing is represented by black circles;
the lightweight glazing by white circles,
the reinforced glazing by black squares,
the reinforced lightweight glazing by white squares, and
the reinforced PMMA glazing by gray triangles.

FIG. 2 shows that thinning the outer glass without reinforcements of the interlayer leads to weakening with respect to the hail,
that the substitution of ⅔ of the interlayer by PMMA doubles the performance with respect to hail, and
that the reinforced lightweight glazing withstands the hail better than the standard glazing while being lighter by 1.8 kg/m².

FIG. 3 shows a glass sheet 2 intended to be in contact with the exterior atmosphere and a complex adhesive interlayer 4a, 5, 4b according to the invention, which are set back with respect to the structural transparent substrate 1a, 6, 1b.

In FIG. 4, the interlayer 4a, 5, 4b from FIG. 3 has been depicted as a single block with the reference number 3. The parts of the glazing enabling mechanical connection (attachment) to the cabin of the aircraft, either clamped or bolted, are represented by two dotted zones. The glass sheet 2 and the interlayer 3 (including the stiff polymer material 5) are not part of the attachment of the laminated glazing. The total thickness of the glass sheet 2 and of the interlayer 3 is adjusted to produce aerodynamic continuity with the window pane retainer 7, the thickness of which is itself governed by the need to withstand the pressurization forces. The material of the glass sheet 2 ensures the abrasion resistance, and the possibility of supporting heating layers with an anti-icing function based on ITO (tin-doped indium oxide). The interlayer 3 therefore consists of three layers of polymer material, with a density 2.5 times lower than that of the glass 2. For the purpose of weight reduction, it is advantageous to minimize the thickness of the glass sheet 2, and therefore to increase the thickness of the interlayer 3. In order to increase the resistance to hail, the invention uses a complex interlayer as described above, in which it is important in particular that the layer of flexible polymer material 4a is not too thick.

In FIG. 5, the stiff polymer material 5 is set back with respect to the exterior glass sheet 2. The set-back peripheral part of polymer material 5 is extended by a filling or plugging by flexible polymer material 4c having the same characteristics as the flexible polymer materials 4a, 4b.

The invention claimed is:

1. A laminated glazing comprising a structural transparent substrate bonded to a glass sheet with a thickness of between 0.5 and 4 mm, intended to constitute an outer surface of the laminated glazing, by an adhesive interlayer with a thickness of between 4 and 10 mm, wherein the adhesive interlayer successively comprises a thickness of between 0.25 and 2.5 mm of a flexible first polymer material having a relaxation modulus at most equal to 2 GPa for relaxation times at least equal to 10 min, at temperatures at least equal to −40° C., in contact with the glass sheet, then a thickness of a stiff second polymer material having a relaxation modulus at least equal to 4 GPa, for time constants at most equal to 0.1 millisecond and temperatures at most equal to 40° C.

2. The laminated glazing as claimed in claim 1, wherein 40% to 90% of the thickness of the adhesive interlayer consist of said stiff second polymer material, and 10% to 60% of this thickness consist of said flexible first polymer material.

3. The laminated glazing as claimed in claim 1, wherein a thickness of said flexible first polymer material is inserted between and in contact with the thickness of said stiff second polymer material and the structural transparent substrate.

4. The laminated glazing as claimed in claim 1, wherein the relaxation modulus of said first polymer material is at most equal to 0.5 GPa for relaxation times at least equal to 10 min, at temperatures at least equal to −40° C.

5. The laminated glazing as claimed in claim 1, wherein an elastic modulus of said second polymer material is at least equal to 5 GPa, for time constants at most equal to 0.1 millisecond and temperatures at most equal to 40° ° C.

6. The laminated glazing as claimed in claim 1, wherein the thickness of the glass sheet is between 1.5 and 3 mm.

7. The laminated glazing as claimed in claim 1, wherein the glass sheet consists of chemically toughened glass or is thermally tempered.

8. The laminated glazing as claimed in claim 1, wherein the structural transparent substrate comprises at least one glass sheet or several laminates, at least one of which is chemically toughened.

9. The laminated glazing as claimed in claim 1, wherein said first polymer material is chosen from a thermoplastic polyurethane (TPU), polyvinyl butyral (PVB), ethylene-vinyl acetate (EVA) alone or as a mixture or copolymer of several thereof.

10. The laminated glazing as claimed in claim 1, wherein said second polymer material is chosen from a poly(methyl methacrylate) (PMMA), polycarbonate (PC), polyurethane (PU), polyester alone or as a mixture or copolymer of several thereof.

11. The laminated glazing as claimed in claim 1, wherein said stiff second polymer material is set back with respect to edges of said glass sheet.

12. The laminated glazing as claimed in claim 1, wherein the glass sheet and the stiff polymer material are set back with respect to the structural transparent substrate, so as not to form part of an attachment of the laminated glazing.

13. A method comprising manufacturing a glazing for an airborne, terrestrial or water-borne vehicle, or for buildings with the laminated glazing as claimed in claim 1.

14. The laminated glazing as claimed in claim 7, wherein the glass sheet is made of soda-lime or aluminosilicate glass.

15. The laminated glazing as claimed in claim 8, wherein the at least one glass sheet of the structural transparent substrate is made of soda-lime or aluminosilicate glass.

16. The laminated glazing as claimed in claim 10, wherein said second polymer material is poly(ethylene terephthalate) (PET).

* * * * *